Jan. 4, 1938.    O. L. GERWIG    2,104,193
CHAIN CONNECTER
Filed Jan. 22, 1937
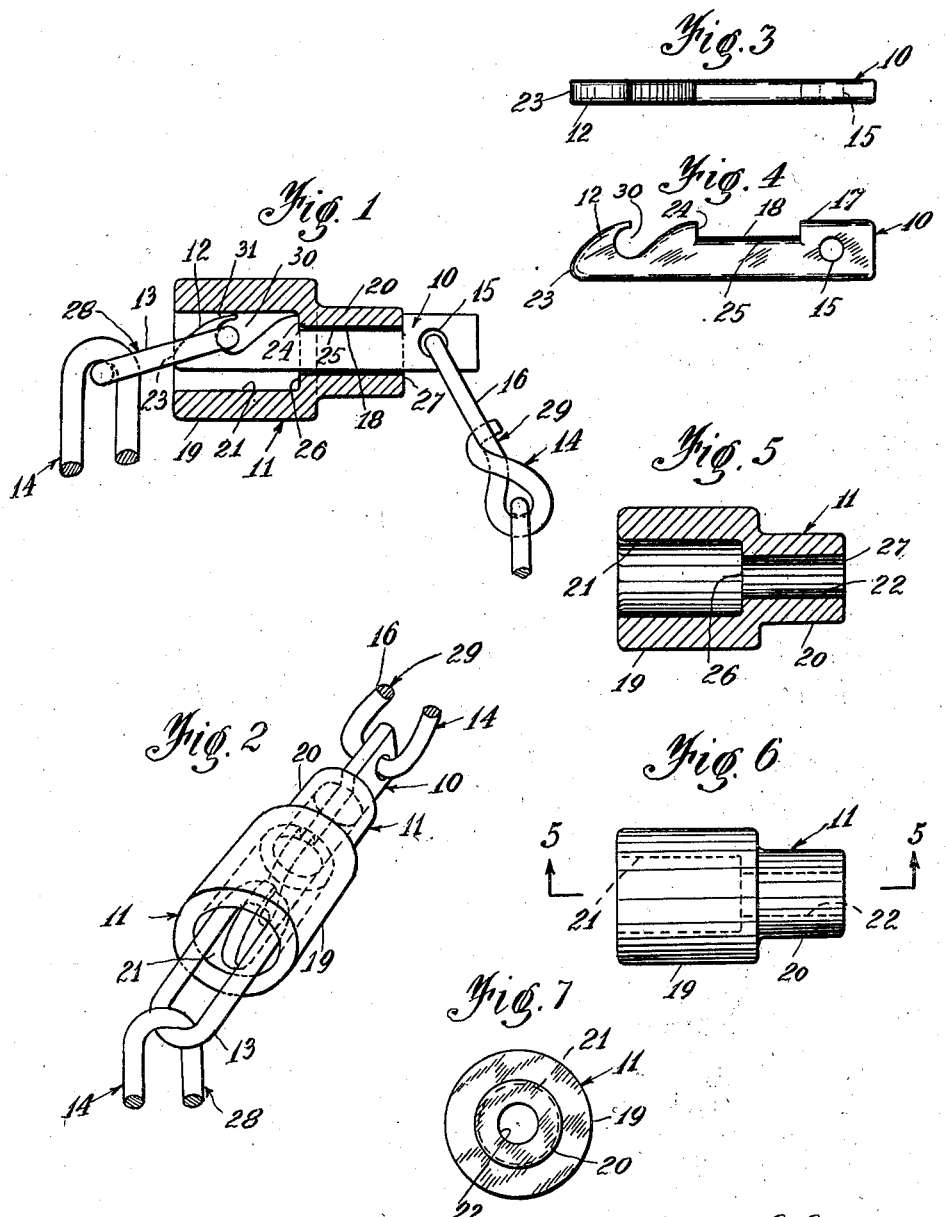
Oscar L. Gerwig
INVENTOR.
BY Ralph Omath
ATTORNEY Patented Jan. 4, 1938

2,104,193

UNITED STATES PATENT OFFICE 2,104,193

CHAIN CONNECTER

Oscar L. Gerwig, Pittsburgh, Pa.

Application January 22, 1937, Serial No. 121,775

4 Claims. (Cl. 24—238)

This invention relates to improvements in connecting devices for chains and more particularly to anti-skid chains such as are applied to tires of motor vehicles to prevent skidding.

As is well known, anti-skid chains are commonly composed of two side members or chains which extend circumferentially of the wheel on opposite sides of the tire and which are linked together at intervals by transverse cross-chains which extend over the thread of the tire. The free ends of each of said side chains are provided with a connecting device which is adapted to be quickly opened or securely locked without the aid of tools.

One of the main objects of the present invention is to provide an arrangement by which side-chains of anti-skid chains may be more easily connected or disconnected.

Another object of the invention is to provide a side-chain connecter which will effect a more secure joinder of its free ends without chance of their becoming opened accidentally.

A further object of the invention is to provide a connecter of the class specified in which the hook-retaining element may be readily replaced without disconnecting the attachment link of the free end of the side-chain.

Still another object of the invention is to provide a connecter of the type specified which is very simple in construction, very efficient for the purpose specified constituted by a minimum number of parts and economical to manufacture.

The above and other features of the invention will become apparent as the detailed description thereof proceeds and are pointed out in the claims.

In the drawing:

Figure 1 is a side elevation of the device for connecting the ends of a side-chain, showing the members in locked position, the flexible sleeve member being in section.

Figure 2 is a perspective view of Figure 1.

Figure 3 is a top view of the hook-member as used in my invention.

Figure 4 is a side elevation of Figure 3.

Figure 5 is a sectional view of the flexible sleeve member along line 5—5 in Figure 6.

Figure 6 is an outline view of Figure 5, and

Figure 7 is an end view of Figure 6.

In the embodiment of the invention selected for illustration and description, it will be noted that my improved chain connecter comprises only two parts, a hook-member 10 and a flexible sleeve-member 11, the former of which comprising a metal bar of substantially rectangular cross-section, having a hook-like extension 12 adapted to attach one of the end links 13 of a side-chain 14, and the opposite end of said hook-member 10 being provided with an aperture 15 to permanently receive an end link 16 of said side-chain 14. The upper edge 17 of said hook-member 10 is also provided with an elongated rectangular recess 18, the purpose of which will be described later.

As detailed in Figures 5, 6 and 7, the flexible sleeve-member, made from soft rubber or any other suitable material, comprises an annular body 19 having a reduced extension 20, said body 19 being provided with a bore 21, said extension being provided with a reduced bore 22, as shown.

The depth of said bore 21 should correspond to approximately the portion of the hook-member 10 which extends from the beak 23 of the hook portion to the edge 24 of the recess 18 (Figures 1 and 4), as shown. The length of the bore 22 of the reduced extension 20 of said sleeve-member 11 should correspond to the length of the recess 18 of the hook-member 10. The bottom edge 25 of said recess 18 is slightly rounded to approximately conform to the curvature of the bore 22.

Figure 1 illustrates the assembled position of the hook-member 10 in the flexible sleeve-member 11, and this is readily accomplished by forcing the hook-end of said hook-member 10 through the bore 22 of extension 20, by doing this the latter will temporarily assume a distorted shape until the recess 18 interlocks with the ends 26 and 27 of the extension 20; when in that position the latter again assumes its normal annular contour.

As is well known, a non-skid chain for vehicle tires is provided with a pair of side-chains which extend circumferentially of the wheel on opposite sides of the tire and they are suitably connected at intervals with cross-links (not shown).

To join the free ends 28 and 29 of side-chain 14, link 16 of free end 29 is permanently secured to the hook-member 10 in a usual manner, and in order to connect end-link 13 of side-chain 14 to the hook-member 10 the same is manipulated through the bore 21 and over the hook-extension 12 by slightly compressing with two fingers the end 19 of the flexible sleeve member 11; as the pressure is released, end 19 again assumes its normal shape. Both free ends 28 and 29 are now securely connected and, due to the fact that the entrant-slot 30 of the hook-member 10 being blocked by the wall of the bore of body 19 of sleeve-member 11, an accidental disengagement of link 13 under any normal strain likely to occur in usage is prevented.

By manually pushing and at the same time turning the end-link 13 of side-chain 14, the link 13 may be readily disengaged from the hook-member 10, when so desired.

To prevent damaging the interior of the sleeve-member 11 the marginal edges of the hook-member 10 may be slightly rounded.

In carrying the invention into effect the gap 31 between the top of the hook-extension 12 and the bore 21 of the sleeve-member 11 should be reduced to a minimum.

It will thus be seen that my invention provides an extremely simple, yet efficient, device which serves to permit ready connection or disconnection of the free ends of a side-chain and it is to be understood also that the general contour of the hook-member as well as the contour of the flexible sleeve-member may be varied as found suitable in particular embodiment of the invention, and others, which need not be described or illustrated, fall within the scope of the invention.

Therefore, without limiting myself in this respect, I claim:

1. In a chain connecter of the class described, a hook-member comprising a hook at one end for detachably securing thereto a link of one end of a chain and a shank-member having at the outer end means for permanently attaching thereto a link of the other end of a chain; a pliable sleeve-member cored to two diameters, the larger core enclosing said hook and the smaller core enclosing part of said shank-member, and means to hold said sleeve-member on said hook-member.

2. In a chain connecter of the class described, a flat metallic hook-member comprising a hook at one end for detachably attaching thereto a link of one end of a chain, a shank-member comprising a wide outer portion having a reduced part intermediate said outer portion and said hook, means positioned at the outer portion of said shank to permanently secure thereto a link of the other end of said chain, a pliable sleeve-member cored to two diameters, the large core enclosing said hook and the smaller core enclosing the reduced portion of said shank, and means to hold said sleeve-member on said hook-member.

3. In a chain connecter of the class described, a flat metallic hook-member comprising a hook at one end for detachably attaching thereto a link of one end of a chain, a shank-member comprising a wide outer portion having a reduced part intermediate said outer portion and said hook, means positioned at the outer portion of said shank to permanently secure thereto a link of the other end of said chain, a pliable sleeve-member cored to two abruptly defined diameters, the large core enclosing said hook and the smaller core enclosing the reduced portion of said shank, and means to hold said sleeve-member on said hook-member.

4. In a chain connecter of the class described, a flat metallic hook-member comprising a hook at one end for detachably attaching thereto a link of one end of a chain, a shank-member comprising a wide outer portion having a reduced part intermediate said outer portion and said hook, means positioned at the outer portion of said shank to permanently secure thereto a link of the other end of said chain, a pliable sleeve-member cored to two abruptly defined diameters, the larger core enveloping said hook and the smaller core enclosing the reduced portion of said shank, said hook-member having two abutments positioned rearwardly of said hook, one adapted to engage the shoulder defined by said two cores and the other one adapted to engage the outside face of the sleeve-member to hold said sleeve-member on said hook-member.

OSCAR L. GERWIG.